(12) United States Patent
Merrill

(10) Patent No.: US 8,333,015 B2
(45) Date of Patent: *Dec. 18, 2012

(54) METHOD FOR ADJUSTING AXLE CAMBER

(75) Inventor: Zachary A. Merrill, Greenville, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 435 days.

This patent is subject to a terminal disclaimer.

(21) Appl. No.: 12/670,991

(22) PCT Filed: Aug. 10, 2007

(86) PCT No.: PCT/US2007/075700
§ 371 (c)(1),
(2), (4) Date: Jan. 27, 2010

(87) PCT Pub. No.: WO2009/023020
PCT Pub. Date: Feb. 19, 2009

(65) Prior Publication Data
US 2010/0192347 A1   Aug. 5, 2010

(51) Int. Cl.
*B21D 53/88* (2006.01)
*B61D 17/00* (2006.01)

(52) U.S. Cl. ............... 29/897.2; 29/402.01; 280/86.751
(58) Field of Classification Search ............... 29/402.01, 29/402.09, 402.14, 407.05, 897.2; 280/86.751
See application file for complete search history.

(56) References Cited

U.S. PATENT DOCUMENTS

| | | | |
|---|---|---|---|
| 1,702,794 A * | 2/1929 | Nichols | 72/31.02 |
| 4,806,047 A | 2/1989 | Morrison | |
| 5,337,531 A | 8/1994 | Thompson et al. | |
| 2010/0313422 A1 * | 12/2010 | Booher | 29/897.2 |

OTHER PUBLICATIONS

International Search Report and Written Opinion for PCT/US07/75700 dated Sep. 22, 2008.

* cited by examiner

*Primary Examiner* — Alexander P Taousakis
(74) *Attorney, Agent, or Firm* — Kurt J. Fugman; Frank J. Campigotto

(57) ABSTRACT

A method for adjusting the camber of a vehicle's axle comprising attaching collars (30, 30', 32, 32', 44) to the axle (12) of the vehicle attaching links (38, 38') to the collars, introducing a deflection in the axle in a concave downward direction and modifying the length.

17 Claims, 6 Drawing Sheets

METHOD FOR ADJUSTING AXLE CAMBER

BACKGROUND OF THE INVENTION

1. Field of the Invention

The present invention relates generally to vehicle axles and more specifically to trailer axles.

2. Background

A vehicle's axle supports the weight of the vehicle and load and also provides a shaft upon which the wheels revolve. Truck rigs carrying heavy loads over long distances provide substantial forces to the axles. The allowable axle loads are restricted by law, but typically tandem truck trailer axles are expected to carry loads of up to 34,000 pounds per tandem. In fact, the camber of the wheels on these loaded axles can be altered by these forces such that the wheels are closer together at the top then at the bottom. This condition is known as negative camber.

Most trailer axles are manufactured with no intentional camber but with an acceptance that when in use, there will be some degree of camber deflection attributable to load. On a new trailer axle, manufacturers typically accept a camber alignment tolerance of about one quarter of a degree, positive or negative. This tolerance applies to the axle beam itself with no load applied and with no consideration for additional camber deflection that may be experienced by components of the hub and the wheel. On a typical truck semi-trailer, even with the minimal load applied by the weight of the empty trailer, each axle end may have a load of approximately 2000 pounds. This load is sufficient to cause the wheels to exhibit a negative camber orientation.

A fully loaded trailer may support a load of about 8500 pounds to each axle end and typically causes as much as one half degree or more of negative camber at the tire. This negative camber indicates that the contact surface of the tires is not parallel to the road surface. Consequently, the tread may wear unevenly, with the inner shoulder wearing most rapidly. When the truck is driven with a reduced load, the inner shoulder may not make firm contact with the ground, which allows slipping.

One solution to the problem above is to remove the axle and deflect it mechanically, or by other means, in the opposite direction. An example of one known technique for effecting a camber change to an axle is by applying heat to the axle to accomplish a plastic deformation. However, manufacturers frequently disapprove of such practices because the variables of the necessary plastic deformation are difficult to control and often explicitly void the warranty. Furthermore, this practice is time consuming and it is difficult to achieve the precise camber required without iterative trials.

SUMMARY OF THE INVENTION

A method is provided for adjusting the camber of a truck's trailer axle comprising attaching a first collar to the trailer axle of the truck, proximate to a first wheel of the truck, the said first collar having an offset link attachment; attaching a second collar to the trailer axle, opposite from the first wheel, proximate to a second wheel of the truck, the said second collar having an offset link attachment; attaching a third collar to the trailer axle, therebetween the first and second collars, the said third collar having an offset link attachment; attaching a first link between the offset link attachment of the first collar and the offset link attachment of the third collar; attaching a second link between the offset link attachment of the third collar and the offset link attachment of the second collar; introducing a deflection in the trailer axle in a concave downward direction; and modifying the length of the first and second links.

A method is provided for adjusting the camber of a truck's trailer axle comprising attaching a first collar, with an offset link attachment, to the trailer axle of the truck, proximate to a first wheel of the truck; attaching a second collar, with an offset link attachment, to the axle, opposite from the first wheel, proximate to a second wheel of the truck; attaching a third collar, with an offset link attachment, to the axle, therebetween the first and second collars and proximate to the first collar; attaching a fourth collar, with an offset link attachment, to the axle, therebetween the first and second collars and proximate to the second collar; attaching a fifth collar, with an extension, to the axle, therebetween the third and fourth collars; attaching a first link between the offset link attachment of the first collar and the offset link attachment of the third collar; attaching a second link between the offset link attachment of the third collar and the offset link attachment of the fourth collar; attaching a third link between the offset link attachment of the fourth collar and the offset link attachment of the second collar; introducing a deflection in the trailer axle in a concave downward direction; and modifying the length of the first, second and third links.

DETAILED DESCRIPTION OF THE PREFERRED EMBODIMENTS

Advantageously, particular embodiments of the present invention provide a method that adjusts the camber of a truck's trailer axle. Other embodiments provide a method that modifies an introduced negative camber of the truck's trailer wheels when a load is applied. The technology has particular applicability to the trailer axles of a semi-truck rig. However, the invention could be applied to other vehicles as well as any axle bearing a load.

Figure 1:
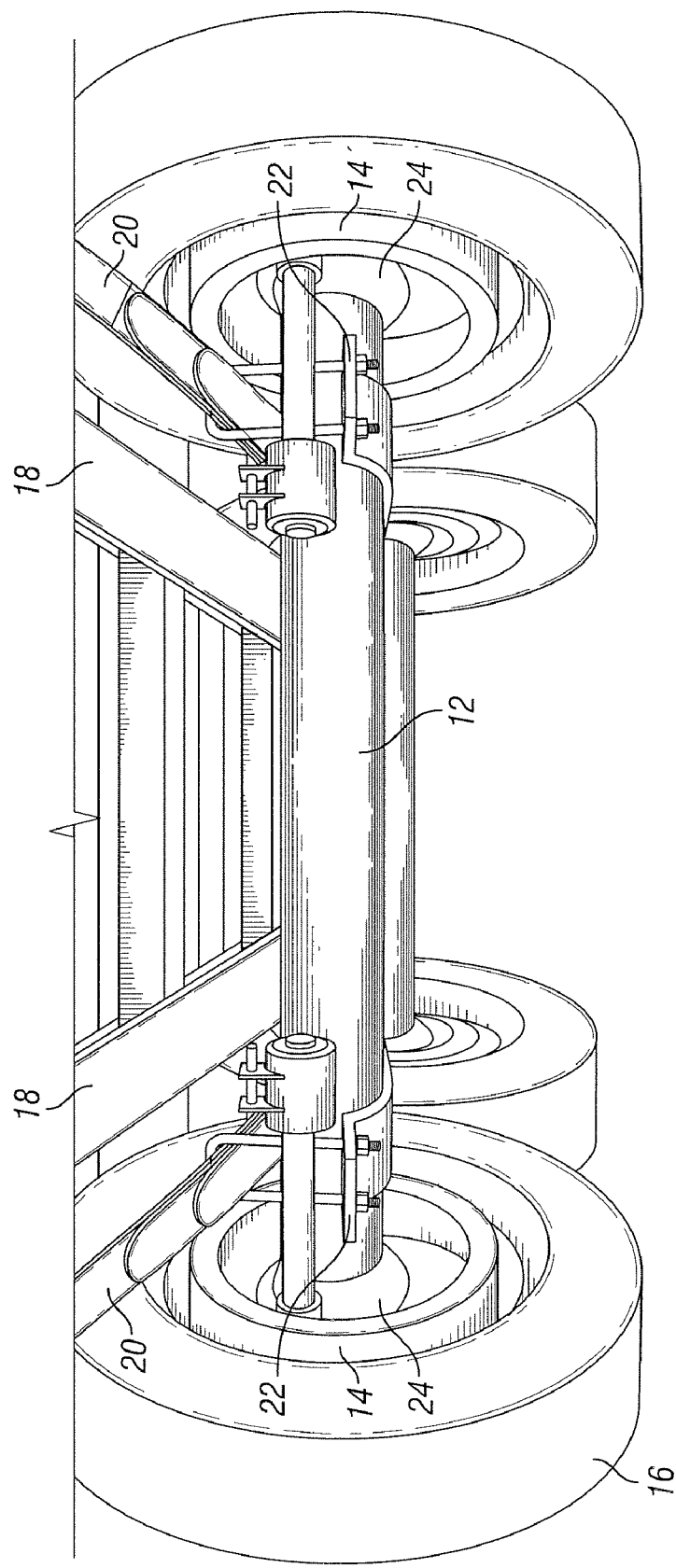
FIG. 1 is a rear view of a truck's trailer axle.

Referring now to the drawings, FIG. 1 illustrates a rear view of a truck's trailer axle 12. As illustrated in FIG. 1, the truck is supported for travel over ground by wheels with attached pneumatic tires. The left wheel 14 and right wheel 14' are attached to an axle 12. The trailer has a pair of frame members 18 which support the weight of the trailer. The frame members 18 are separated from the axle 12 by a pair of springs 20. The springs 20 shown in FIG. 1 are metal leaf springs, although composite leaf springs and air springs are also commonly known in the art. Air springs are airtight units and are connected to a source of compressed air on board the truck. The springs 20 are attached to the axle 12 by means of a spring hanger 22. Also shown attached to the wheels 14 and 14' is a brake backing plate 24.

Figure 2:
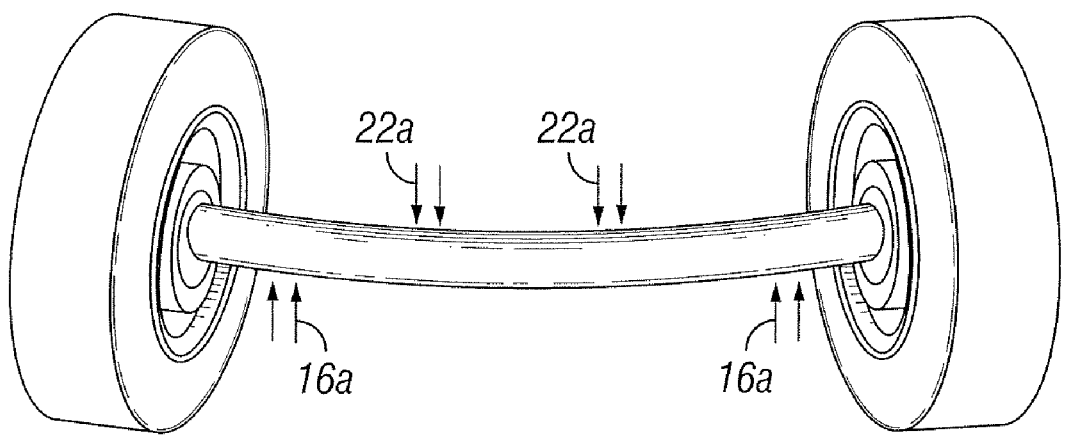
FIG. 2 is a simplified force diagram showing the forces applied to the trailer axle while under load.

With the trailer axle configuration shown in FIG. 1, the ground supplies an upward force to the tire and wheel combinations, while the weight of the trailer is translated to the axle 12, inboard of the wheels 14 and 14', via the air springs 20. FIG. 2 shows a simplified depiction of the forces applied to the axle 12. As shown in FIG. 2, the forces cause the axle 12 to be deflected in a concave downward direction.

Figure 3:
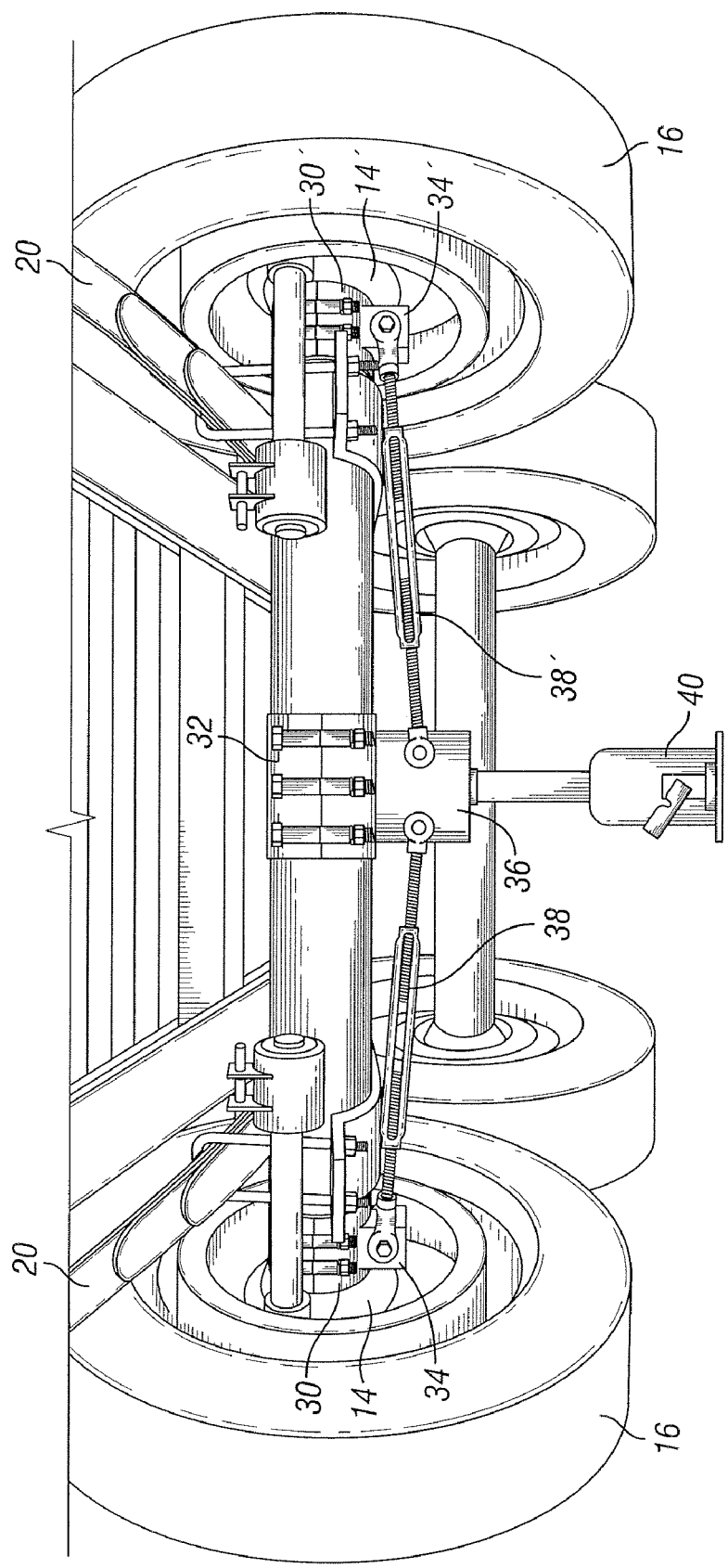
FIG. 3 is a rear view of a truck's trailer axle showing a 3-collar camber truss assembly.

Referring to FIG. 3, a first collar 30 is attached to the axle 12 proximate to the left wheel, and a second collar 30' is attached to the axle 12 proximate to the right wheel. The collars 30 and 30' may be attached in the space between the spring hanger 22 and the brake backing plate 24. In a preferred embodiment, the collar should take up all the space between the spring hanger 22 and the brake backing plate 24 in order to increase the deflection resistance of the axle 12. Attached to the underside of the collars 30 and 30' are offset link attachments 34 and 34'. Between the collars 30 and 30' is a third, inner collar 32, also attached to the axle 12. Attached to the underside of the inner collar 32 is an inner offset link attachment 36. The inner collar 32 is attached to collar 30 by a link 38 and to collar 30' by a link 38'. The links 38 and 38' are connected to the offset link attachments 34, 34' and 36 of their respective collars 30, 30' and 32, for example, by means of a clevis pin. The clevis attachment point for the inner collar 32 should be as long in the vertical direction from the axle 12 as possible, taking into consideration ground clearance considerations. Conversely, the clevis attachment point for the collars 30 and 30' should be as short a vertical distance as practical to the axle 12. The offset link attachments 34, 34' and 36 may each have more than one attachment point in order to provide for adjustable geometry. In the figure, the links 38 and 38' are shown as a turnbuckle, but any threaded adjustable device can be used. The axle, links 38 and 38', collars 30 and 30', inner collar 32, offset link attachments 34 and 34', and inner offset link attachment 36, constitute a camber truss assembly. Also shown below the inner offset link attachment 36 in FIG. 3 is a standard 20 ton shop jack 40.

Figure 5:
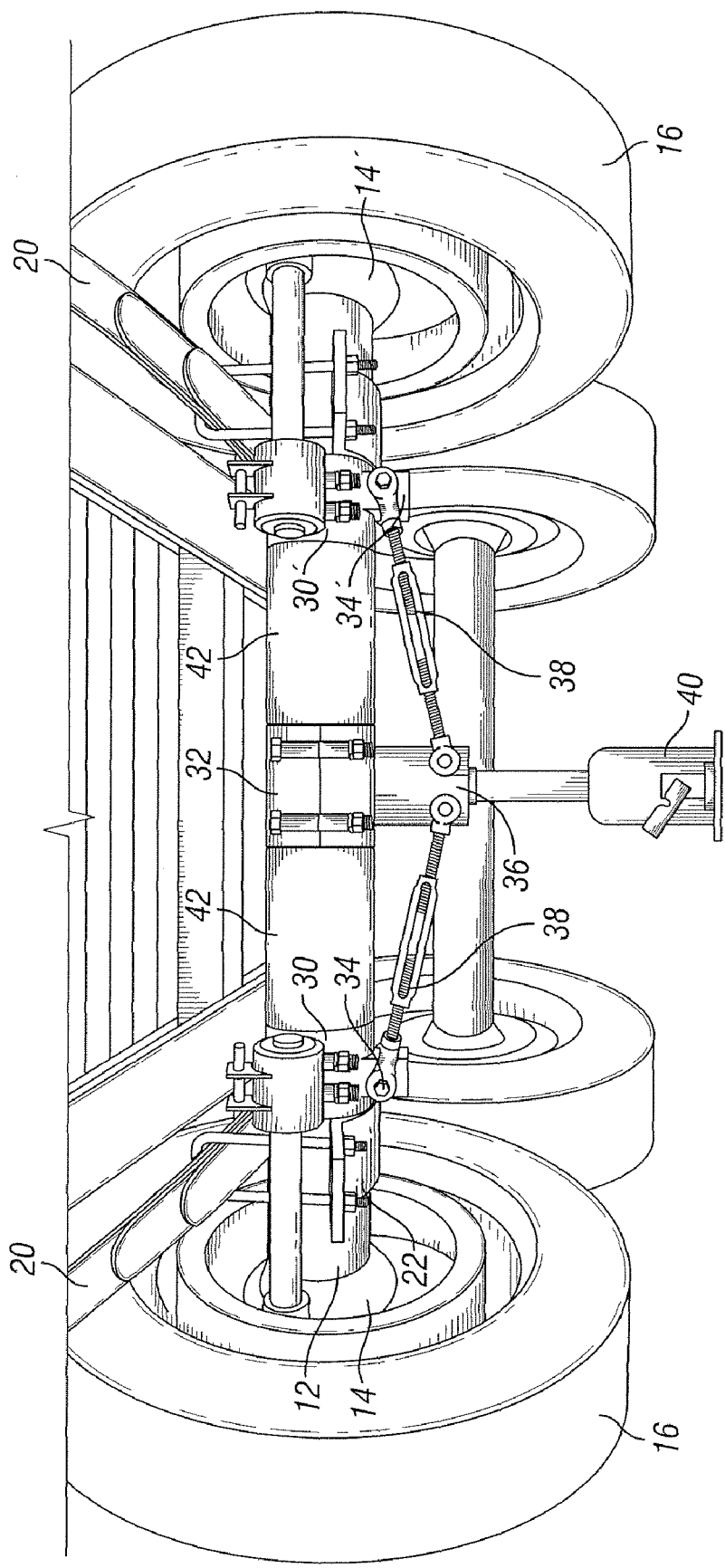
FIG. 5 is a rear view of a truck's trailer axle showing a 3-collar camber truss assembly with a pair of spacer collars.

In certain embodiments where the trailer's air spring configuration does not permit placing the collars 30 and 30' outboard of the spring hangers 22, the collars may be placed inboard of the spring hangers 22. FIG. 5 shows this configuration. To prevent the collars 30 and 30' from slipping towards the inner collar 32 once tension is applied to the links 38 and 38', a pair of spacer devices 42 may be placed between the collars 30 and 30', and the inner collar 32. The spacer devices may take the form of a rod, beam, or a collar as is shown in FIG. 5.

Figure 4:
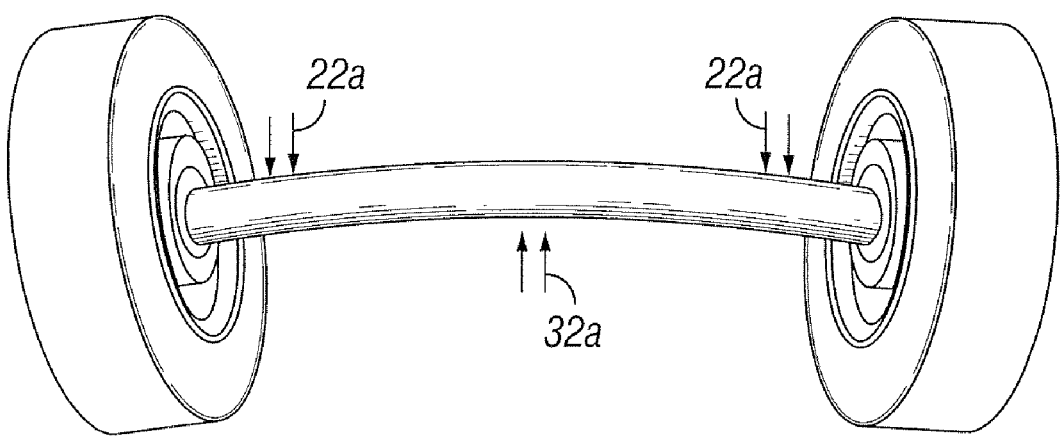
FIG. 4 is a simplified force diagram showing the forces applied to the trailer axle while the trailer is supported by an inner offset link attachment.

In a particular embodiment of the invention, the loaded trailer is lifted off the ground by contacting a shop jack 40 with the inner offset link attachment 36. However, any means of lifting the trailer off the ground such as a standard lift may be used. FIG. 4 shows a simplified depiction of the forces applied to the axle 12 with the trailer supported by the inner offset link attachment 36, rather than the tire and wheel combination as shown in FIG. 2. The weight of the truck applied to the axle 12 via the spring hangers 22, while the axle 12 is supported proximate to its center, causes the axle 12 to deflect in a concave downward direction. In the instances where the trailer utilizes air springs, it is preferable to release the air from both the front and rear air springs prior to lifting the trailer. This is done to assist in lifting the tires and wheel combination off the ground so that all the weight of the truck is applied to the inner offset link attachment 36.

After lifting the loaded trailer off the ground, the length of the links 38 and 38' are reduced, causing them to come into tension. Once the shop jack 40 is subsequently removed, the load of the trailer is once again supported by the tire and wheel combination. However, the camber truss assembly now supplies sufficient rigidity to the axle 12 to resist much of the bending moment. The camber truss assembly thus preserves most of the current axle camber correction. If too much deflection is introduced in the axle 12 by supporting the load of the trailer at the inner offset link attachment 36, the tension in the links 38 and 38' may be reduced until a desired setting is reached. Although this setting might be zero camber, other settings are possible. If the links 38 and 38' are later removed from the axle 12, the axle 12 returns to its original deflection, because there is no significant plastic deformation.

Figure 6:
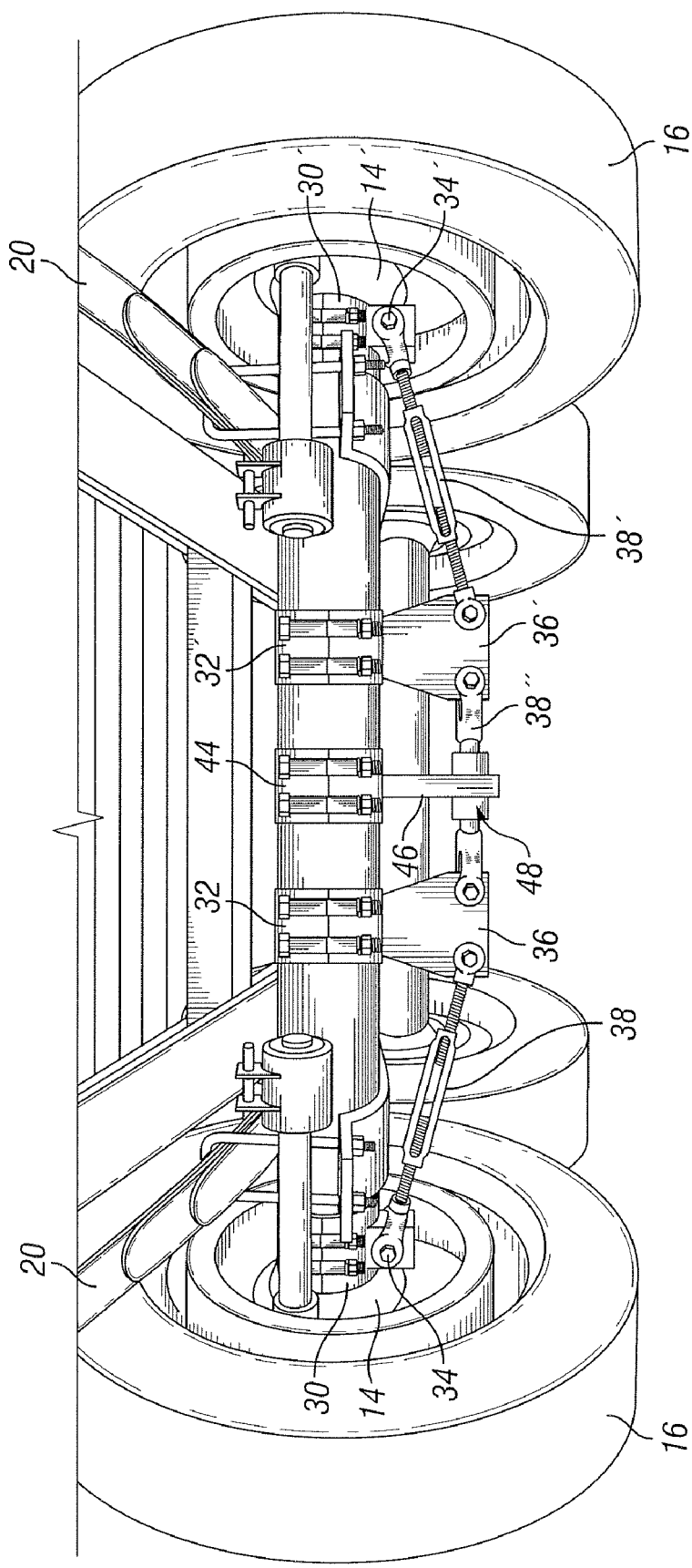
FIG. 6 is a rear view of a truck's trailer axle showing a 4-collar camber truss assembly.

FIG. 6 shows an alternative embodiment of the invention. In certain cases where it is not possible to fit the 3-collar design onto the axle because of constraints imposed by the suspension and braking configurations, a 4-collar design may be utilized. In FIG. 6, a pair of collars 30 and 30' are attached to the axle 12 proximate to the left and right wheels 14 and 14' respectively. Attached to the underside of the collars 30 and 30' are offset link attachments 34 and 34'. Between the collars 30 and 30', an inner collar 32 is attached to the axle 12 proximate to collar 30 and an inner collar 32' is attached to the axle 12 proximate to collar 30'. Attached to the underside of the inner collars 32 and 32' are inner offset link attachments 36 and 36'. Between the inner collars 32 and 32' a fifth collar 44 is attached to the axle. Attached to the underside of the fifth collar 44 is an extension 46. The extension 46 contains an opening 48 through which a link may extend.

The utilization of the 4-collar design is similar to the 3-collar design with the following exceptions. Collar 30 is attached to inner collar 32 with link 38. Collar 30' is attached to inner collar 32' with link 38'. The inner collars 32 and 32' are then connected to each other by a link 38" which passes through the opening 48 in the extension 46. The loaded trailer is lifted off the ground by contacting the shop jack 40 with the extension 46 of the fifth collar 44. Once the loaded trailer is off the ground, the lengths of each of the links are reduced, causing the links to come into tension. The fifth collar 44 may be removed after the desired camber correction has been made, but it should be removed without disturbing the links. To facilitate this, the extension 46 should have a removable rod 50 or, in an alternative embodiment, a hinge portion which retains the structural integrity of the extension 46 during loading.

Figure 7:
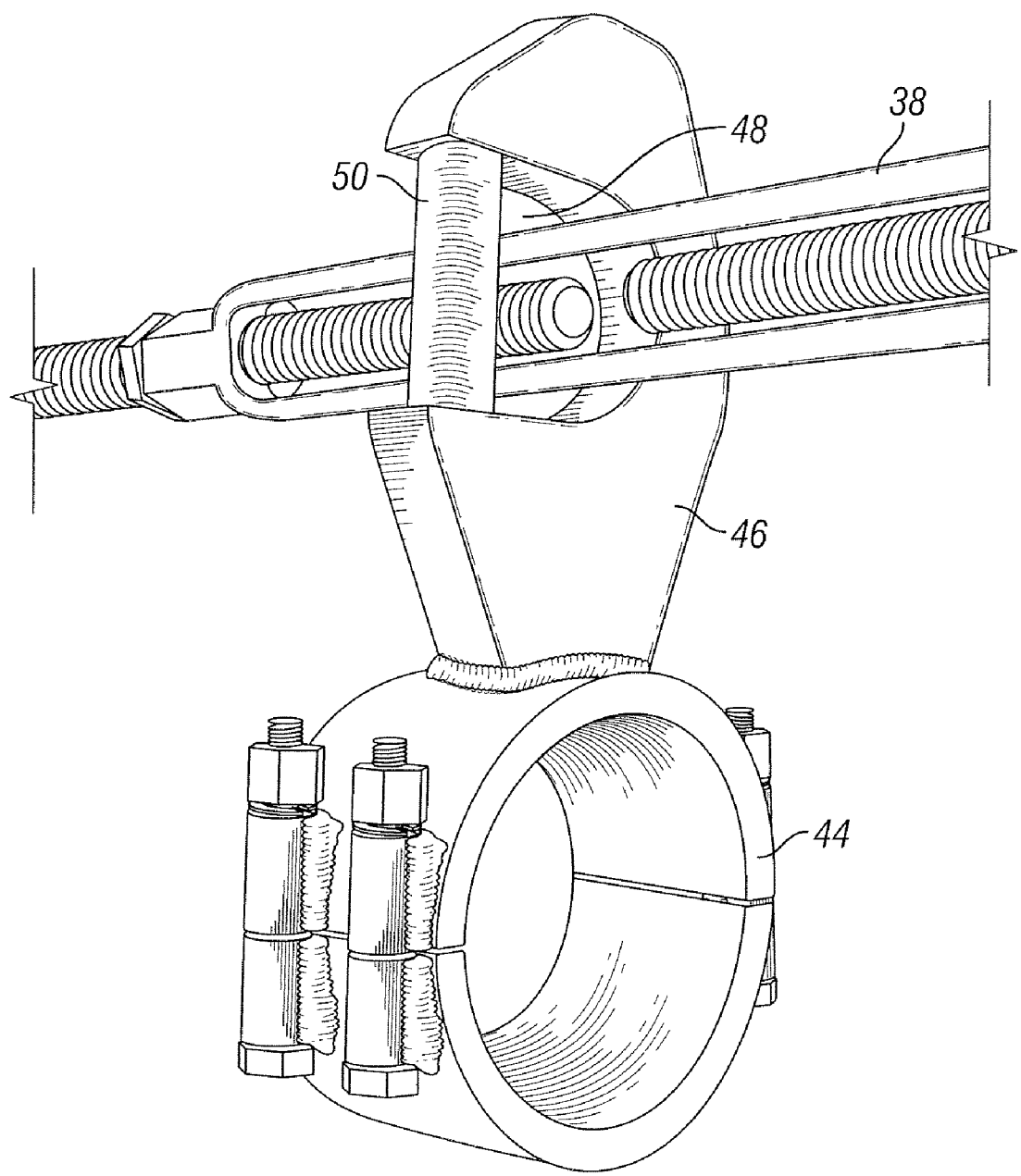
FIG. 7 is a perspective view of a removable jacking fixture.

FIG. 7 shows a closer view of the fifth collar 44 and extension 46 with a removable rod 50. The removable rod 50 can be moved in and out of the extension opening by hand until sufficient force is applied to the extension 46; for example, by contacting the extension 46 with a floor jack. At that point, the extension 46 is temporarily deformed, clamping the rod 50 into place.

What is claimed is:

1. A method for adjusting the camber of a vehicle's axle comprising: attaching a first collar to the axle of the vehicle, proximate to a first wheel of the vehicle, the said first collar having an offset link attachment; attaching a second collar to the axle, opposite from the first wheel, proximate to a second wheel of the vehicle, the said second collar having an offset link attachment; attaching a third collar to the axle, therebetween the first and second collars, the said third collar having an offset link attachment; attaching a first link between the offset link attachment of the first collar and the offset link attachment of the third collar; attaching a second link between the offset link attachment of the third collar and the offset link attachment of the second collar; introducing a deflection in the axle in a concave downward direction; and modifying the length of the first and second links.

2. A method according to claim 1, wherein the step of introducing a deflection in the vehicle axle comprises applying an upward force to the offset link attachment of the third collar.

3. A method according to claim 2, wherein the step of applying an upward force to the offset link attachment comprises applying the upward force with a jack.

4. A method according to claim 3, wherein the step of attaching links at the offset link attachments comprises attaching the links at 2 or more alternative locations on each offset link attachment.

5. A method according to claim 4, wherein the step of modifying the length of the first and second links comprises rotating turnbuckles.

6. A method according to claim 4, wherein the step of modifying the length of the first and second links comprises adjusting a toe sleeve.

7. A method according to claim 5, wherein the step of attaching a third collar to the vehicle axle, therebetween the first and second collars, comprises attaching the third collar at the center of the axle.

8. A method according to claim 1, wherein the vehicle comprises a truck with a trailer axle.

9. A method according to claim 8, wherein the step of attaching a first and second collar to the axle of the truck comprises attaching the first collar outboard of a first spring hanger and attaching the second collar outboard of a second spring hanger.

10. A method according to claim 8, wherein the step of attaching a first and second collar to the axle of the truck comprises attaching the first collar inboard of a first spring hanger and attaching the second collar inboard of a second spring hanger.

11. A method according to claim 10, comprising attaching a first spacer collar therebetween the first and third collars and a second spacer collar therebetween the second and third collars.

12. A method according to claim 8, comprising releasing air from air springs attached to the trailer.

13. A method for adjusting the camber of a truck's trailer axle comprising: attaching a first collar, with an offset link attachment, to the trailer axle of the truck, proximate to a first wheel of the truck; attaching a second collar, with an offset link attachment, to the axle, opposite from the first wheel, proximate to a second wheel of the truck; attaching a third collar, with an offset link attachment, to the axle, therebetween the first and second collars and proximate to the first collar; attaching a fourth collar, with an offset link attachment, to the axle, therebetween the first and second collars and proximate to the second collar; attaching a fifth collar, with an extension, to the axle, therebetween the third and fourth collars; attaching a first link between the offset link attachment of the first collar and the offset link attachment of the third collar; attaching a second link between the offset link attachment of the third collar and the offset link attachment of the fourth collar; attaching a third link between the offset link attachment of the fourth collar and the offset link attachment of the second collar; introducing a deflection in the trailer axle in a concave downward direction; and modifying the length of the first, second and third links.

14. A method according to claim 13, wherein the extension of the fifth collar terminates below the second link and wherein the second link passes through a hole in said extension.

15. A method according to claim 14, wherein the step of introducing a deflection in the trailer axle comprises applying an upward force to the extension of the fifth collar.

16. A method according to claim 15, wherein the step of attaching a fifth collar to the axle, therebetween the third and fourth collars, comprises attaching the fifth collar at the center of the axle.

17. A method according to claim 15, comprising removing the fifth collar and extension subsequent to modifying the length of the first, second and third links.

* * * * *